UNITED STATES PATENT OFFICE.

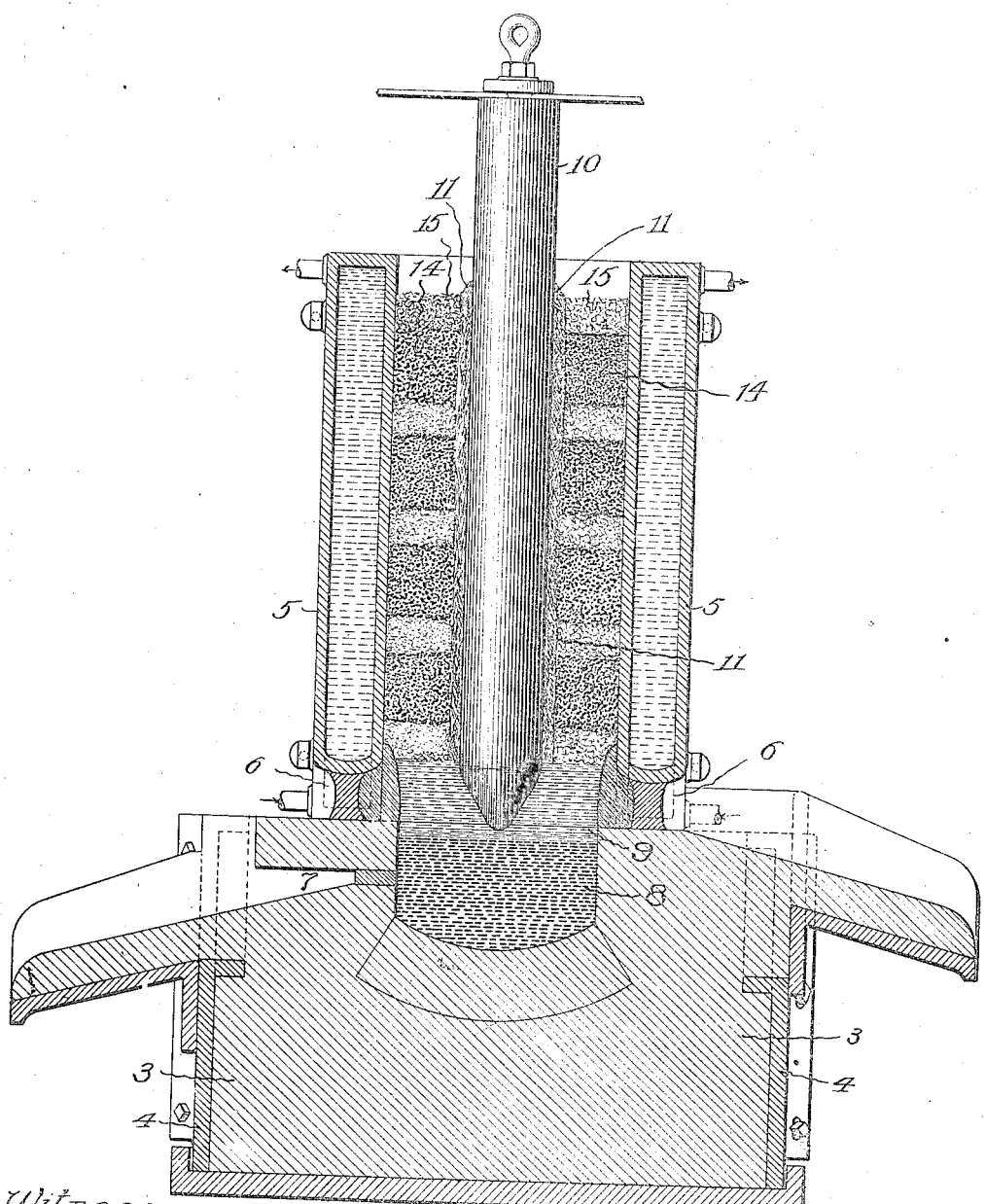

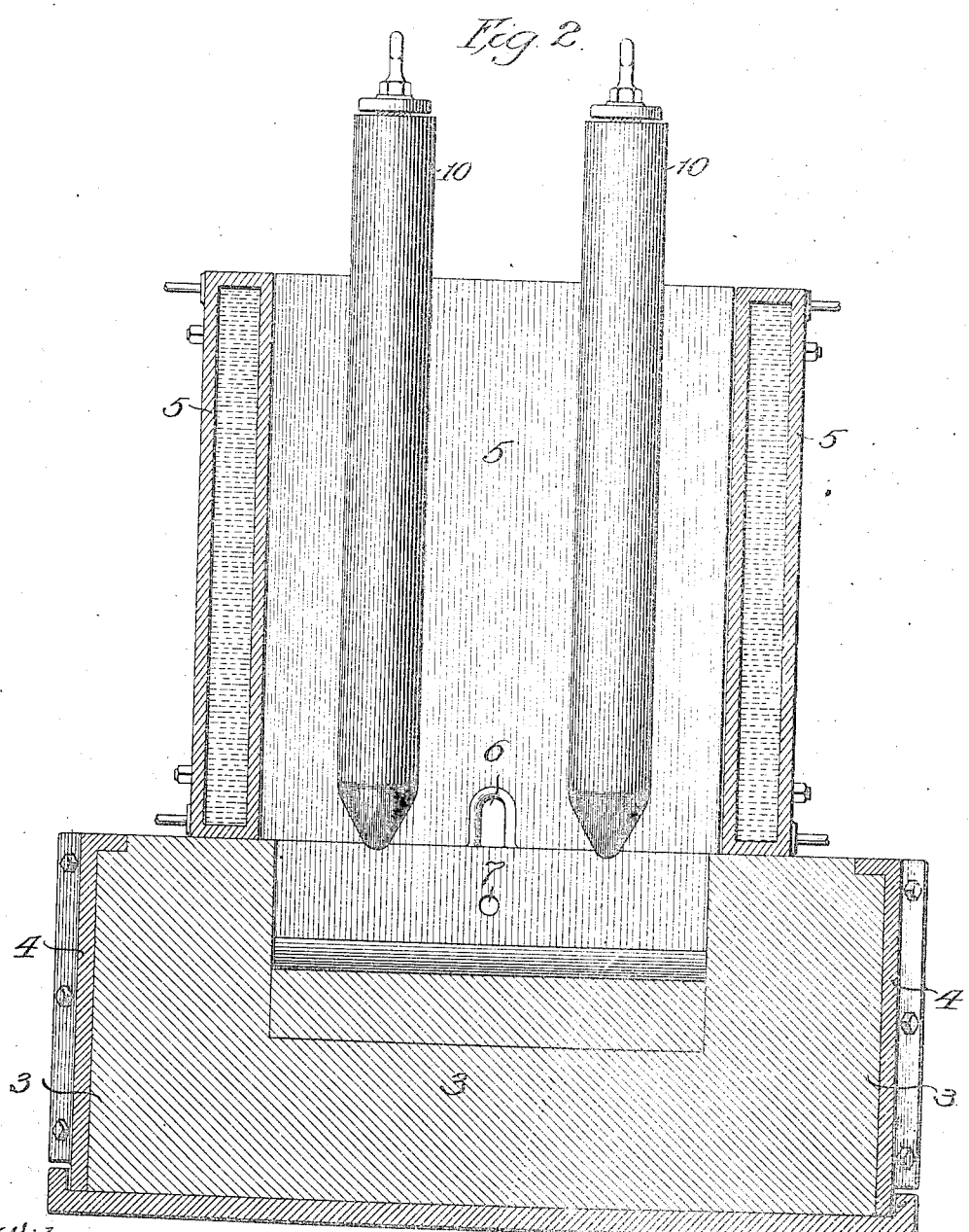

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

PROCESS FOR SMELTING ORE.

974,608.

Specification of Letters Patent.

Patented Nov. 1, 1910.

Application filed July 1, 1907. Serial No. 381,585.

*To all whom it may concern:*

Be it known that I, FREDERICK T. SNYDER, a citizen of the United States, residing at Oak Park, in the county of Cook and State of Illinois, have invented a certain new and useful Improvement in Processes for Smelting Ore, of which the following is a full, clear, concise, and exact description.

This invention relates to a process for smelting ore, with especial reference to the treatment of iron ore, for the direct production of steel therefrom.

Previous attempts to produce steel directly from iron ore by electric smelting have met with serious practical difficulties, one of which has been the rapid destruction of the furnace walls by corrosive slags. Attempts to overcome this by making the crucible of carbon result in impairing the product because the carbon combines with the molten metal and produces pig iron instead of steel.

In accordance with the present invention, only sufficient carbon is mixed with the furnace charge to secure reduction of the metal from the ore and to produce steel; and the molten metal when produced is collected in a crucible of refractory, and preferably basic, material, such as dolomite, while the slag is confined by a fluid-cooled wall in contact therewith, which freezes the outlying portions of the slag bath to form a lining or container composed of solid slag. The necessary heat is produced by passing an electric current between carbon electrodes which dip into the molten slag from the top, but do not extend downward deep enough to reach and contaminate the steel in the crucible. Two or more electrodes are provided, for taking the current both into and out of the furnace through the top, in order to avoid having any carbon in the crucible or as a part thereof.

The water-jackets protect the masonry crucible on which they rest to a depth of several inches, and the metal level in the crucible is kept high enough so that the slag cannot reach a low enough level to cut through the crucible under the water-jackets. The metal, however, is not allowed to accumulate in the crucible to such an extent that it would come into contact with the water-jackets, as this would freeze the metal solidly upon the jackets, and result in a very great heat-loss. This loss is prevented, and the steel kept from contamination by keeping it in the refractory crucible, the material of which also serves to actually purify the steel by taking up small amounts of phosphorus and sulfur therefrom.

The invention will be more particularly described, and further features thereof explained, by reference to the accompanying drawing, in which—

Figure 1 is a vertical sectional elevation of an electric furnace adapted to practice this invention; and Fig. 2 is a vertical sectional elevation at right angles to Fig. 1.

The same letters of reference indicate the same parts in both figures.

The furnace shown comprises a crucible base 3 of refractory masonry such as dolomite, contained within and supported by a surrounding metal caisson 4. Surmounting this crucible base is a water-jacket 5 forming a furnace chamber of which the crucible is the bottom. Tap-holes 6, 6 for removing the slag are provided near the bottom of the water-jackets, and preferably on opposite sides thereof. These holes are normally filled with plugs, and only one of them is ordinarily used for tapping, the other being provided in case the first should be too difficult to open.

A tap-hole 7 for removing metal is provided in the wall of the crucible, preferably at a point above the bottom and diametrically-opposite one of the slag taps. The advantage of this construction is that the plug in the metal tap-hole can be driven out from the inside by driving a bar through the slag tap and diagonally downward across the furnace until it strikes the plug in the metal tap and forces it out.

A further feature of the invention which is applicable generally to electric furnaces in smelting oxid ores, is the protecting of the carbon electrodes by surrounding the body portions thereof with an oxid of a metal having a higher temperature of reduction than the metal being produced. Thus, in making steel, the electrodes, where they pass through the body of the charge, are preferably surrounded by lime, which protects them from contact with the ore (from which they would tend to take up oxygen and be consumed) and also serves as a fluxing agent at the smelting zone. The protection of the electrodes by the lime also prevents the carbon of said electrodes from unduly combining with the steel and impairing its quality.

When the furnace is in operation, the crucible is filled nearly to the top with molten metal 8, above which is a body of molten slag 9, contained by the water-jackets 5; and the charge to be smelted is fed through the open top of the furnace to the slag bath. The furnace is heated by electric current passed between carbon electrodes 10 which extend down through the top of the furnace and dip into the slag bath. The electrodes, however, are kept high enough so that they will not contact with the molten metal in the crucible. The current is taken both into and out of the furnace by such electrodes introduced through the top of the furnace, so that the molten metal in the crucible can be maintained free from contact with carbon. Any carbon in the structure of the crucible would be apt to be taken up by the steel, changing the desired composition thereof and correspondingly corroding such carbon of the crucible structure; and the use of a water-jacketed metal electrode in contact with the steel would be impracticable because it would freeze up the metal and result in very great loss of heat.

The furnace may be started by melting pig-iron in the crucible by starting an arc thereon with the electrodes, and then feeding cold slag in lumps and allowing it to melt down until a proper quantity is provided to serve as the resistance medium. The furnace charge, consisting of ore and carbon in proper proportions to form steel, and lime as a fluxing agent, is then fed into the top of the furnace around the electrodes. Preferably the shanks of the electrodes are surrounded by lime 11 to prevent them from being too quickly consumed by taking up oxygen from the ore. The lime is an oxid requiring a much higher temperature for reduction than iron oxid, and is not itself reduced at the temperature employed, but is merely dissolved in the slag as a fluxing agent.

The temperature of the furnace is regulated by proportioning the furnace charge so as to produce a slag which will form at the high temperature required for iron smelting. The determination of the kind of slag to be produced is important, because if the materials are so mixed as to produce a slag which forms at a low temperature, the temperature of the furnace cannot rise materially above such low point as long as any considerable portion of the charge remains unsmelted. Under such conditions, an increase in the strength of the electric current being applied would merely result in increasing the rate of smelting, not in increasing the temperature. The slag to be produced should preferably be made strongly basic in character, in order that it may absorb the phosphorus from the ore and prevent such phosphorus from entering the steel. Such basic slag may be produced by feeding an excess of alkaline oxid, such as lime, with the charge, such lime being preferably fed closely around the electrodes, as before described. The ore and charcoal are preferably charged in alternate layers, the last layer of charcoal 14 at the top being always covered by a layer of ore 15, to prevent the charcoal from being burned, as it would be if left in contact with the open air.

The ore is gradually reduced as it is fed downward toward the slag, which is the hottest part of the furnace; and the metal as produced immediately sinks below the slag and collects in the refractory crucible. The metal, however, is not allowed to accumulate to such a point that it would rise into contact with the water-jackets. When the crucible is full, the slag is first tapped off through the hole 6, after which a bar is driven through the slag tap across the furnace and through the plug which normally closes the metal tap, opening the metal tap and allowing the metal to run out. It will be noted that the metal tap is at a point some distance above the bottom of the crucible so that a considerable quantity of metal is always left in the crucible. This residual metal is useful to preserve uniformity in the product and also to maintain the heated condition of the furnace and permit a continued operation thereof to begin the smelting of the next charge. The body of metal left in the crucible also prevents the slag which is formed at the beginning of the next smelting operation from collecting at a low enough level to attack the lower portions of the crucible walls which are not protected by the water-jackets.

It will be noted that the short-circuiting of any considerable proportion of the current through the metal water-jackets is prevented, because the slag where it comes into contact with such jackets is congealed to a solid form which is an effective insulator; the slag being an electric conductor only when molten. If a piece of the congealed slag lining of the water-jacket should break off, it would be immediately renewed by fresh molten slag coming into contact therewith.

I claim:—

1. The process of making steel which consists in smelting iron ore with a minimum of carbon in an electric furnace having a refractory crucible surmounted by water-jacketed walls and electrodes surrounded by material adapted to flux the earthy constituents of the ore, whereby steel low in carbon may be produced and collected out of contact with carbon, and the walls of the furnace saved from corrosion in the absence of a carbon lining.

2. The process of making steel from iron ore in an electric furnace, which consists in feeding such ore mixed with sufficient carbon to reduce such ore and provide the required carbon contents of the steel, while preventing the absorption of additional carbon by shielding the electrodes with lime, said lime being adapted to flux the earthy constituents of the ore, and collecting the metal in a crucible free from carbon.

3. The process of operating an electric furnace having a carbon electrode, for the smelting of oxid ore, which consists in feeding such ore into the furnace and in protecting the electrode by surrounding said electrode with the oxid of a metal having a temperature of reduction substantially higher than the temperature of reduction of the metal being produced.

4. The process of smelting iron ore for the direct production of steel, which consists in forming a furnace charge of such ore, with a quantity of carbon only slightly in excess of the amount required for reduction, smelting such charge upon a slag bath by heat developed by an electric current passed through said slag, regulating the composition of the furnace charge so as to produce a slag which forms at a temperature suitable for the reduction of the iron and formation of steel, collecting the molten metal out of contact with carbon in a crucible of basic material, while confining said slag bath by fluid-cooled walls and thereby congealing the outlying portions of the slag to form an insulating lining for said fluid-cooled walls.

5. The process of electrically smelting iron ores which consists in passing an electric current between two or more electrodes dipping into a slag bath, feeding the ore mixed with reducing material to said slag bath, cooling the outlying portions of the slag bath to form a container or lining composed of solid slag, and collecting the molten material in a crucible of basic material underneath said slag.

6. The process of smelting iron ore for the direct production of steel, which consists in forming a furnace charge of such ore and a quantity of carbon only sufficient to reduce said ore and form steel therefrom, smelting such furnace charge by heat produced electrically in the body of the charge, thereby forming molten slag and an underlying body of molten metal, congealing the outer portion of the body of molten slag by cooling fluid to form a solid slag container for said molten slag, and collecting the molten metal below the level of the slag in a crucible of basic material, and maintaining said material free from continuous contact with carbon; current being passed into and out of the furnace through electrodes reaching down through the top thereof and dipping into the molten slag, said electrodes being kept out of contact with the molten metal in the crucible.

In witness whereof, I, hereunto subscribe my name this 28th day of June A. D., 1907.

FREDERICK T. SNYDER.

Witnesses:
De Witt C. Tanner,
Alfred H. Moore.